Jan. 30, 1945. H. C. HAYES 2,368,218
ELECTRICAL PROSPECTING
Filed Dec. 6, 1944 4 Sheets-Sheet 1

Inventor

HARVEY C. HAYES

By _F. V. Bush_
Attorney

Jan. 30, 1945. H. C. HAYES 2,368,218
ELECTRICAL PROSPECTING
Filed Dec. 6, 1944 4 Sheets-Sheet 2
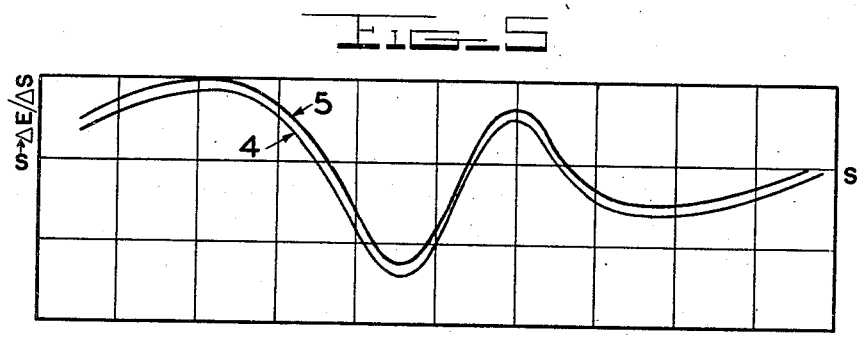
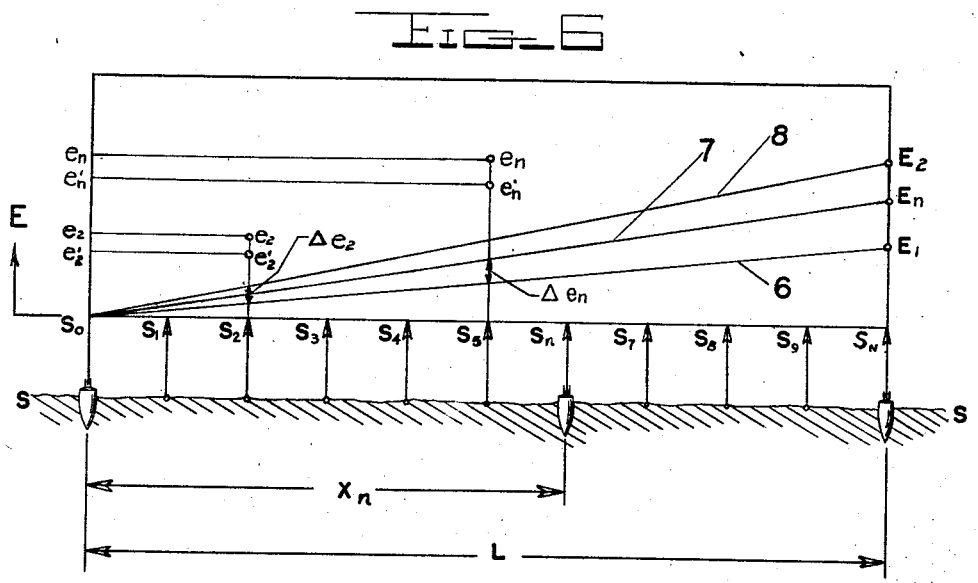
Inventor
HARVEY C. HAYES

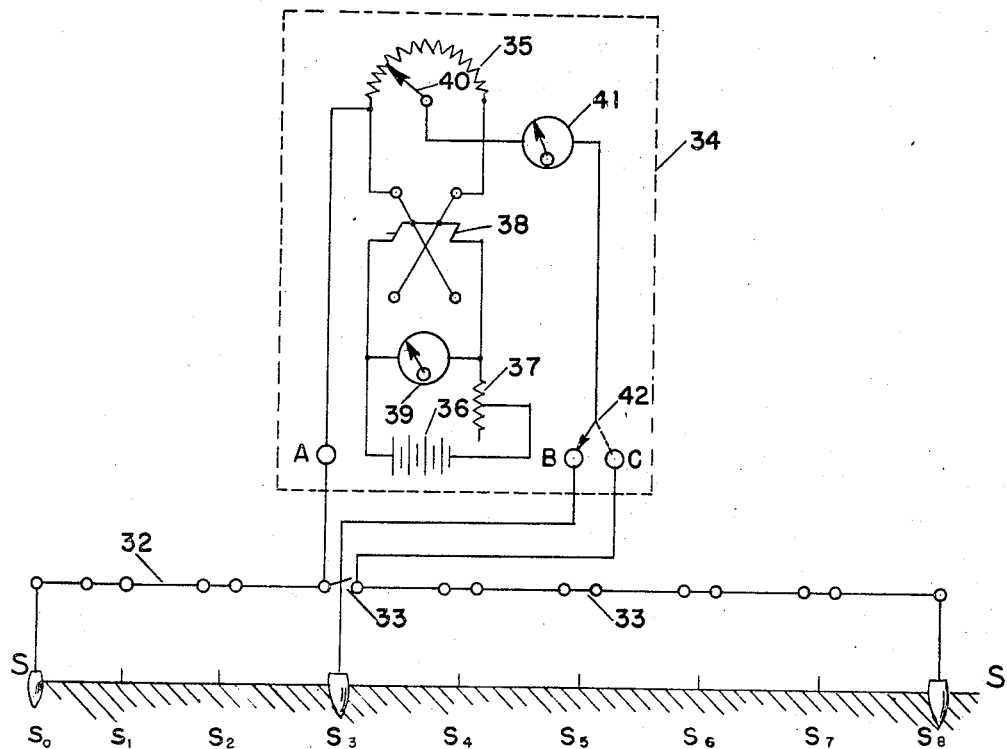

Jan. 30, 1945. H. C. HAYES 2,368,218
ELECTRICAL PROSPECTING
Filed Dec. 6, 1944 4 Sheets-Sheet 4

Inventor
HARVEY C. HAYES

Patented Jan. 30, 1945

2,368,218

UNITED STATES PATENT OFFICE 2,368,218

ELECTRICAL PROSPECTING

Harvey C. Hayes, Washington, D. C.

Application December 6, 1944, Serial No. 566,937

9 Claims. (Cl. 175—182)

(Granted under the act of March 3, 1883, as amended April 30, 1928; 370 O. G. 757)

The present invention relates to electrical prospecting. The present application is a continuation-in-part of application, Serial No. 350,002, filed August 2, 1940.

In the said application, there is disclosed a method of electrical prospecting with the aid of which it is possible to determine the presence and the probable boundaries of oil-bearing formations, as well as other physical characteristics, such as the depth and the inclination. According to the said method, differences of electrical potential are measured, preferably at points along one or more surface-profile traverse lines on the earth. From these measurements, it is possible to determine whether the potentials were caused, at least in part, by substantially vertically directed natural electrical-current sheets associated with the boundaries of oil-bearing formations deep underneath.

Where the potentials are caused, in part, by the surface currents associated with the said current sheets, the remaining part may be caused by extraneous broad-gauge telluric or earth currents that usually originate in remote regions, and for the effects of which it is desirable to correct the measurements. Various methods for correcting for these earth currents are described in the said application.

The present application is more particularly concerned specifically with one of these methods, based on the concept and the use of a normal-potential profile.

Figure 1:
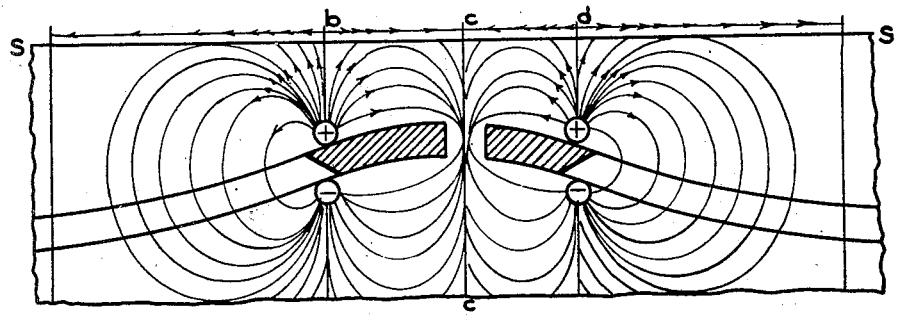
Figure 2:
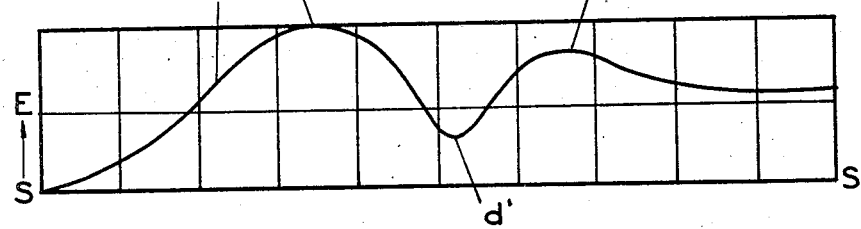
Figure 3:
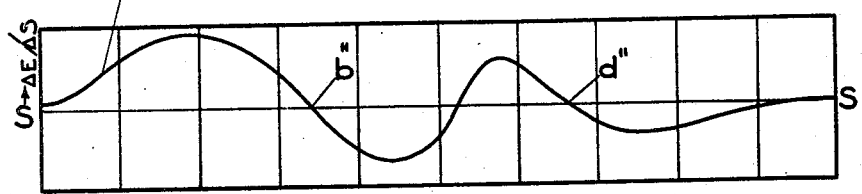
Figure 4:
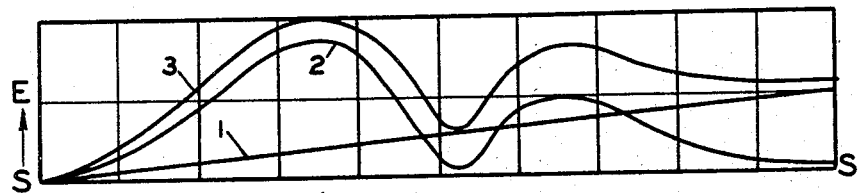
Figure 8:
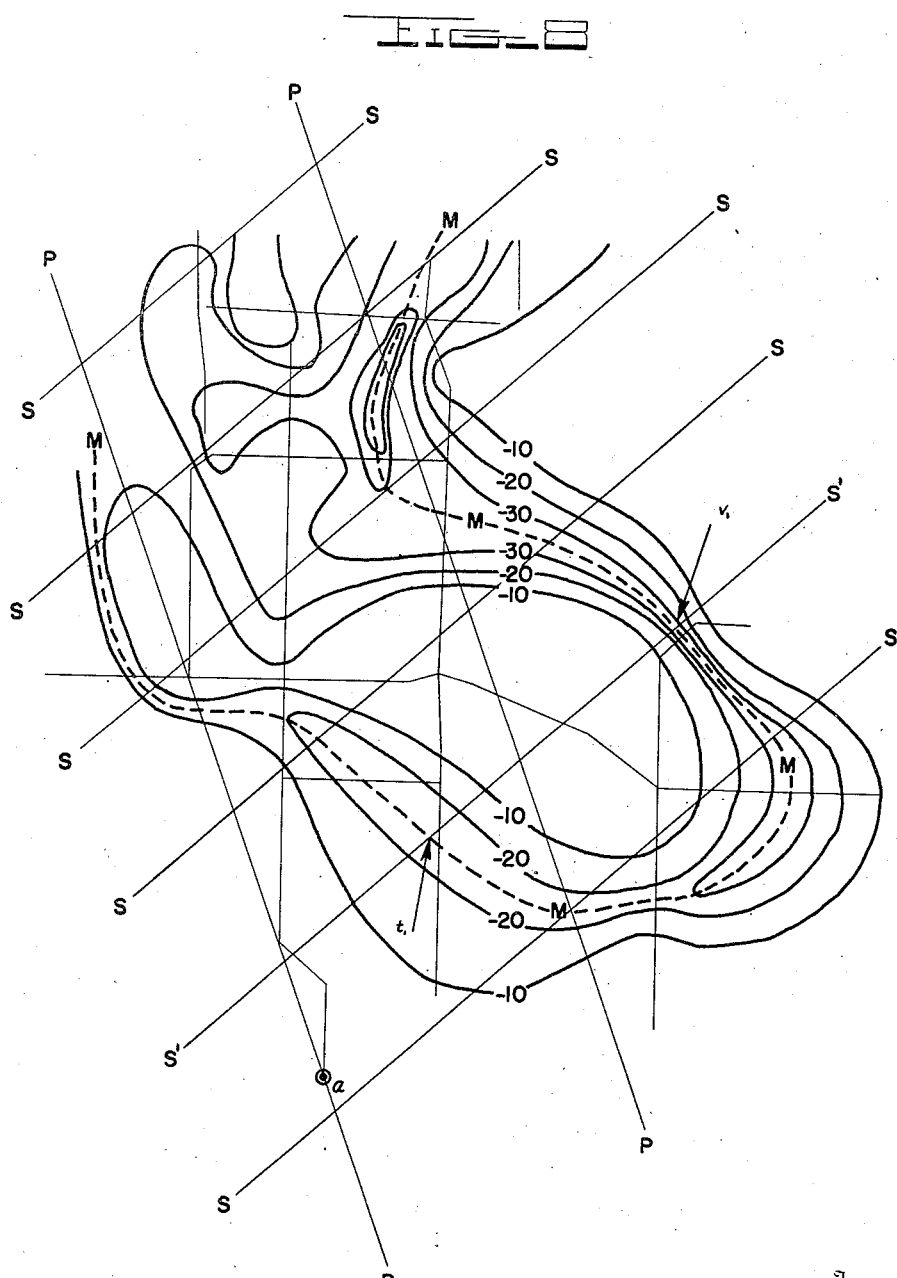

The invention will be more fully explained in connection with the accompanying drawings, in which Fig. 1 is a vertical section of the earth's structure, taken along a surface-profile line, showing a characteristic oil-bearing formation of a specific type—shown perforate, by way of example—with its associated surface currents and substantially vertically directed current sheets; Fig. 2 is a characteristic potential-profile curve based upon the distribution of the surface currents indicated in Fig. 1, as developed from potential measurements taken along the disclosed surface-profile line, the broad-gauge telluric or earth currents being assumed to be constant; Fig. 3 is the corresponding characteristic potential-differential-profile curve; Figs. 4 and 5, in addition to the potential-profile and the potential-differential-profile curves of Figs. 2 and 3, respectively, show also the corresponding curves corrected for the effects introduced by the extraneous earth currents; Fig. 6 is a diagram explanatory of a preferred procedure for correcting for the effect of varying earth currents; Fig. 7 is a diagrammatic view of a suitable potentiometer arrangement and its application along a selected surface-profile line for obtaining the desired potential data; and Fig. 8 is a plan view of a portion of the earth's surface, showing a portion of a plot of experimental derived equipotential curves constructed from corrected potential profiles plotted from field measurements on the overlying and adjacent portions of an area of the earth's surface in Texas.

It is not necessary here to explain all the various types of oil-bearing formations that may be found in nature. The formation illustrated in Fig. 1 will serve as an example. It is of the perforate type, and is indicated by the hatched area, the perforated or conducting area being shown centered or symmetrical with respect to a center line $c$—$c$. The arrows indicate the direction and the intensity of the surface currents along the surface-profile line $s$—$s$.

The lines of current flow beneath the surface are roughly indicated by closed curves having their origin substantially at the horizontal boundaries $b$ and $d$ of the oil-bearing formation. Since the bounding electromotive forces are unidirectional, they drive the electrical-current sheets, at opposing boundaries, substantially vertically upward or downward, depending upon the sense of their polarization. In Fig. 1, these boundary current sheets, as indicated by the arrows and the polarities, are assumed to be deflected and directed upward.

Let it be assumed that it is desired to survey an area, such as the area illustrated in Fig. 1, for the purpose of locating the boundaries of an oil-bearing formation beneath the surface. Measurements may be made over the oil-bearing formation along the surface-profile line $s$—$s$. It will be assumed that the surface-profile line $s$—$s$ has been chosen sufficiently long so as to extend for a substantial distance beyond both boundaries of the oil-bearing formation.

A well-insulated cable 32 is shown laid out along the surface-profile line $s$—$s$ of Fig. 7. It may be divided into a plurality of detachable sections, of lengths equal to the respective distances between the stations at which to make the potential measurements. The points or junctions of connection between the terminals of adjacent cable sections are shown at 33. If the cable sections are of equal length, they will conveniently establish equally spaced stations $S_0$, $S_1$, $S_2$ . . . $S_n$ . . . to $S_N$, inclusive. It may be assumed, for simplicity of description, that $N=8$, providing for eight stations, joined electrically by $N$ substantially equal lengths of cable. This is the condition diagrammatically illustrated in Fig. 7. The more general situation is depicted in Fig. 6.

The first or origin station $S_0$ is shown fixed at one end terminal of the cable 32; it may be referred to as one end station. The last station $S_N$ is shown fixed at the opposite end terminal of the cable; it may be referred to as the other end station. An electrode is driven into the earth at each of these end stations $S_0$ and $S_N$. A third electrode is also provided, for grounding at the successive stations when measurements are to be made thereat.

The terminals of the junction connections are normally connected together, to provide for measuring the potential between the end stations $S_0$ and $S_N$, but they are disconnected successively at the successive stations to permit of making other measurements, as hereinafter more fully described.

The second station $S_1$ is separated from the end station $S_0$ by one cable length; the third station $S_2$ is separated from the end station $S_0$ by two cable lengths; and the $(n+1)$ station is separated from the end station $S_0$ by $n$ cable lengths.

A potentiometer 34, indicated schematically within a dashed enclosure, is provided with an input terminal A and two output terminals B and C. The terminals A and C are shown respectively connected to the earthed electrodes at the respective end terminals of the cable 32. Either the output terminal B or the output terminal C may be readily connected through the potentiometer circuit by means of a single-pole, double-throw switch 42. The potentiometer may be connected at any of the cable junctions 33 by breaking the junction connection, and connecting one terminal of this junction 33 to the input terminal A and the other terminal to the output terminal C. The terminal A is connected successively to successive stations along the traverse. The output terminal B is carried with the potentiometer, for grounding the earthed electrode at the particular station at which the measurement is being made. The last-named electrode remains connected to the terminal B of the potential-measuring device.

The potentiometer is shown including a resistor 35, across which a known adjustable voltage drop may be maintained by a battery 36 and an adjustable resistor 37, through a double-pole, double-throw switch 38. The voltage drop across the resistor 35 may be measured by a voltmeter 39. The resistor 35 is provided with an adjustable control arm 40, the position of which may be calibrated, along a scale of the potentiometer, in fractional parts of the known voltage drop across the resistor. The control arm 40 is shown connected in series with the input terminal A and with either the output terminal B or the output terminal C, through a galvanometer 41 and the switch 42.

The voltage drop between the terminal A and either the terminal B or the terminal C may thus be measured by adjusting the contact arm 40 until the galvanometer 41 reads zero. When this occurs, the potential difference between the terminals A and B or A and C, as the case may be, is balanced against a known voltage drop along the resister 35, which is readily ascertained from the calibrated scale of the potentiometer. If, in the course of exploration, the direction of the potential drop along the surface-profile line should become reversed, the direction of the voltage drop across the resistor 35 should also be changed, to effect a balance. This may be achieved by closing the switch 38 in the proper direction.

In the use of the apparatus, to obtain data from which to plot the potential and the potential-differential profiles, a series of readings are taken of the potential drops between the earthed electrode at the station $S_0$ and the earthed electrodes at each of the stations $S_1$, $S_2$, $S_3$, $S_4$ ... $S_n$ ... $S_N$. Simultaneously with each of these readings, a reading is taken also of the voltage drop between the end stations $S_0$ and $S_N$.

To make the first-named reading, the terminal A of the potentiometer may first be connected to the left-hand terminal of the junction 33 at the station $S_1$, and the switch 42 is thrown to the left, into contact with the terminal B, grounded at station $S_1$. The arm 40 is adjusted until the galvanometer 41 reads zero. A measurement of the voltage drop between the stations $S_0$ and $S_1$ may then be made readily by reading the calibrated scale of the potentiometer. The terminal A may next be connected to the left-hand terminal of the junction 33 at the station $S_2$, and the terminal B may be grounded at this point—the terminals of the junction 33 at the station $S_1$ being connected together—and another measurement may similarly be made to determine the voltage drop between the stations $S_0$ and $S_2$. This operation may be repeated at each station $S_n$ of the remaining stations until measurements of the voltage drop have been made at all the stations. The potential-profile curve may be plotted from these measurements.

From the readings so obtained of the potential drops between the stations $S_0$ and $S_1$, $S_0$ and $S_2$, and so on, it is possible to plot potential-profile and potential-differential-profile curves, one each corresponding to each surface-profile line thus measured. The potential-profile curve may be obtained by experimentally plotting the observed differences of electric potential E between the station $S_0$ corresponding to the successive stations $S_1$, $S_2$, $S_3$ ... $S_n$ ... $S_N$, as ordinates, and the distances or ranges along the surface profile line $s$—$s$, corresponding to these stations, as abscissae. These differences of electrical potential may be obtained merely by subtraction. As an illustration, the potential drop E between the stations $S_1$ and $S_2$ is equal to the observed value of the potential drop between the stations $S_0$ and $S_2$ minus the observed value of the potential drop between the stations $S_0$ and $S_1$. In the potential-profile curve, the potential plotted at each station along the traverse is the potential between the two electrodes at stations $S_0$ and $S_n$. In the potential-differential-profile curve, the ordinate at each station may be the difference between the potential difference at that station and the potential difference at the next adjacent station. The potential-differential-profile curve may thus be obtained graphically by plotting the increments $\Delta E$ of the electromotive force E for equal relatively small increments $\Delta s$ corresponding to the various stations on the surface-profile line $s$—$s$. These potential-difference increments $\Delta E$, between the said differences of the potential differences, at the successive stations, may preferably, but not necessarily, be plotted at the mid-points of each small increment $\Delta s$ between the stations across which they are measured. The small increments $\Delta s$ would be measured along the axis of abscissae. The potential-differential-profile curve, therefore, shows what is essentially the rate of change of potential along the profile being traversed, and corresponds to the mathematical space derivative of the potential-profile curve. The ordinates of the potential-differential-profile curve represent the rate of change of the potential with respect to the distance along the surface-profile line.

A comparison of these potential-profile and potential-differential-profile curves with corresponding characteristic potential-profile and potential-differential-profile curves, as explained in the said application, will result in determining the presence and the extent, as well as other characteristics, of an oil-bearing formation beneath.

In actual practice, it is not necessary actually to correlate the plotted curve with a number of characteristic curves, in order to find a characteristic curve of form analogous to the plotted curve. The number of these characteristic curves is relatively small, and their shapes and critical features are easily carried in mind. All that the prospector does, therefore, is to study the plotted curve itself, and its characteristics and critical features. He does not find it necessary to compare it with characteristic curves of analogous form.

In actual practice, the prospector first plots his curves from the measurements. Even before the measurements have all been plotted, he recognizes from the presence or absence of the critical features thereof whether or not the curve is representative of a known oil formation. In the former case, he knows immediately, from the nature of the critical features of the curve, the type of the oil-bearing formation. In the latter case, he knows that he must therefore seek elsewhere for oil. As explained in the said application, the critical points may be maximum points, minimum points, zero points, and others. The maximum points $b'$ and $d'$ of the potential profile $3$ of Fig. 2, experimentally derived from field measurements, and the zero points $b$ and $d$ of the potential-differential profile $4$ of Fig. 3, for example, are critical in fixing the limits of the depicted perforate-type oil-bearing structure.

Let it be assumed that the slotted potential-profile curve, for example, is of a type that has a critical feature or features, such as a critical point or points, known to represent earth potentials resulting from current streams arising from the peripheries of a known type of oil-bearing formation, and known to indicate the presence or the physical characteristics, such as the boundaries, the depth and the inclination, of the known type of oil-bearing formation. The probable presence or physical characteristics of an oil-bearing formation beneath the measured surface-profile line or lines may then be readily determined by mere analogy of the critical feature or features of the plotted potential-profile curve with the critical feature or features of the potential-profile curve of the said type. Similarly, if the plotted potential-differential-profile curve is of a type that has a critical feature or features known to represent earth potentials resulting from current streams arising from the peripheries of a known type of oil-bearing formation and known to indicate the presence or the physical characteristics of the known type of oil-bearing formation, the probable presence or physical characteristics of an oil-bearing formation beneath the measured surface-profile line or lines may be readily determined by similar analogy of the critical feature or features of the plotted potential-differential-profile curve with the critical feature or features of the potential-differential-profile curve of the said type. And similar analogy may be availed of if the plot of the equipotential curves is of the type that has a critical feature or features known to represent earth potentials resulting from the said current streams and known to indicate the presence or the physical characteristics of a known type of oil-bearing formation. The equipotential plots will be discussed hereinafter in connection with Fig. 8.

The potential-profile and the potential-differential-profile curves may result from the natural electrical currents associated with the oil-bearing formation alone, without any substantial telluric currents being present. The curve $2$ of Fig. 4, for example, is the potential-profile curve resulting from the local oil-associated earth currents alone of a formation such as that illustrated in Fig. 1; it represents the local electric currents other than the said telluric currents, caused by the before-mentioned current sheets. The curve $4$ of Fig. 5 is the corresponding potential-differential-profile curve; it is the differential of the potential-profile curve $2$ of Fig. 4.

The beginning and the end portions of such a potential-profile curve will usually define a substantially straight line, which may be termed the normal-potential-profile curve. Still assuming the absence of extraneous earth currents, the straight-line ends of this normal-potential-profile curve, if carried far enough beyond the oil formation, would naturally be at the same horizontal level, because they would extend beyond the influence of the local currents associated with the formation. The normal-potential-profile curve is therefore a straight horizontal line. It is the curve that the measurements would yield if there were no oil formation present, and no associated vertically directed current sheets.

In some areas, however, as before stated, there are also extraneous telluric or earth currents, originating usually in regions far removed from the areas under test. In this case, as in the case where only local earth currents are associated with an oil-bearing formation, a critical point or points, or some other critical feature or features, of the potential-profile curve or the potential-differential-profile curve, will still serve to locate approximately the presence and the limits of the oil-bearing formation along the surface-profile line, as well as other characteristics of the formation. It is desirable, however, to take into consideration the potentials due to the extraneous earth currents during the plotting of the potential-profile and the potential-differential-profile curve.

Where a surveyed area carries both these telluric currents and the local currents associated with an oil deposit, the beginning and the end portions of any potential-profile curve crossing the oil area will still define a substantially straight line, which may still be termed the normal-potential-profile curve. This potential-profile curve will still represent the telluric currents alone, assumed to be constant, as they often are. It will be the profile that would result from the telluric currents alone if they remained constant, and if the resistivity of the earth path along the surface-profile line $s$—$s$ were uniform; but it will now be inclined to the horizontal, as shown by the normal-potential-profile curve $1$ of Fig. 4. This therefore represents a vertical tilt of the potential-profile curve; the maximum and minimum ordinates $b'$ and $d'$ will not be of the same value, as would ordinarily be the case with oil-bearing formations the normal-potential-profile curve of which is horizontal.

The slope of this normal potential-profile curve 1 is determined by the component of the before-described broad-gauge telluric or extraneous earth currents directed along the surface-profile line s—s.

Each ordinate of the potential-profile curve 3, plotted from the observed data, is the algebraic sum of the corresponding ordinates of the curves 1 and 2. The ordinates of the potential-profile curve 3, therefore, represent the combined potentials of both the local and the extraneous earth currents traversing the area under survey. They indicate the currents represented by the normal potential-profile curve 1 superposed over the currents represented by the potential-profile curve 2 resulting from the local oil-associated earth currents alone.

In order to construct the potential-profile curve 2, due to the local oil-associated currents alone, therefore, all that is necesary is to make its ordinates equal to the algebraic difference of the corresponding ordinates of the experimentally developed potential-profile curve 3 and the normal-potential-profile curve 1. The potential-profile curve 2, thus corrected, will minimize the effects that would otherwise be introduced through analyzing the critical point or points or feature or features of the uncorrected potential-profile curve 3.

It is possible to compensate also for the errors that might otherwise be introduced through the use of uncorrected potential-differential-profile curves, as well. The nature and the magnitude of the distortion introduced into the potential-differential-profile curve by the extraneous earth currents giving rise to the linear profile 1 of Fig. 4 may be understood from Fig. 5. The potential-differential-profile curve 4 of Fig. 5, as is apparent, is not a distortion of the desired or corrected potential-differential-profile-curve 5; it is rather simply a vertical displacement of the curve 5. This displacement is numerically equal to the slope of the normal-potential-profile curve 1 of Fig. 4. An experimentally determined potential-differential-profile curve 5 may therefore be corrected for the effects of extraneous earth currents by properly shifting it along the direction of the axis of ordinates by an amount equal to the slope of the normal-potential profile.

Experience has proved that the extraneous broad-gauge earth currents may change considerably during the measurements, in direction or magnitude or both, and that these changes cannot be predicted. The configuration of a potential profile derived from field measurements usually differs, therefore, to a greater or lesser extent, from the above-described linear form of the normal-potential profile 1. Such departures as definitely exceed the errors of measurement indicate the presence of non-homogenities along the profile path s—s, if the telluric currents remain constant while the potential measurements are made. Such departures, however, may be meaningless and entirely misleading if the telluric currents change appreciably during the test period.

The present invention embodies ways and means of achieving undistorted potential profiles irrespective of fluctuations of the telluric currents.

Let it be assumed, for example, referring to Fig. 6, that there are ten stations; that is $N=10$. Let it be assumed that a reading $e_1$ is taken at the station $S_1$, at the junction 33 of the first cable section, of the potential difference between the stations $S_0$ and $S_1$, with the switch 42 connected to the terminal B. Let it further be assumed that, at the same definite time that this reading is taken, a further reading $E_1$ is obtained at the same station of the potential difference between the stations $S_0$ and $S_N$, with the switch 42 connected to the terminal C. Let this last-named reading be 20 millivolts. $E_1$ is shown plotted as ordinate above the last station N. This 20-millivolt figure may then be adopted as a reference normal potential. Let it be also assumed that, when the potentiometer is moved to the next station $S_2$, the potential difference $E_2$ between the stations $S_0$ and $S_{10}$, due to the extraneous earth currents, has risen to 25 millivolts. In order to compensate for this change of 5 millivolts across the whole profile, the fractional part of this change, represented by the ratio of the distance $S_0$ to $S_2$ to the distance $S_0$ to $S_{10}$, or 2/10, should be subtracted from the measured potential difference $e_2$ between the stations $S_0$ and $S_2$ to bring the reading of this potential difference into conformity with the assumed 20-millivolt reference normal-potential profile.

Stated in terms of the symbols in Fig. 6, the measured value of $e_2$, while $E_2$ was 25 millivolts, is greater than it would have been had the value of $E_2$ remained equal to $E_1$, or 20 millivolts, by an amount indicated by $\Delta e_2$, Fig. 6. This is equal to the amount that the $E_2$ profile differs from the $E_1$ profile, at the point $S_2$. Obviously, $$\Delta e_2 = (E_2 - E_1)\frac{X_2}{L}$$

where $X_2$ represents the distance between the origin end station $S_0$ and the station $S_2$, and L represents the distance between the end station $S_0$ and the station $S_N$.

$$\Delta e_2 = (25-20)\frac{2}{10} \text{ millivolts}$$
$$= 1.00$$

This correction should be subtracted from the $e_2$ measurement to bring it into conformity with the 20-millivolt normal-potential profile.

Let a number of such potential measurements, $e_1, e_2 \ldots e_n$ be taken of the potential difference between the stations $S_0$ and $S_2$, $S_0$ and $S_3$, etc., at the various stations, simultaneously with the measurements $E_1, E_2 \ldots E_n$, respectively, made across the whole line, between the end stations $S_0$ and $S_N$. These readings may similarly be adjusted, in this manner, for any further changes in potential due to extraneous earth currents between the stations $S_0$ and $S_N$ that may have taken place during the taking of the readings at the various stations.

More generally, let $e_n$ and $E_n$ represent, respectively, the simultaneous potential difference between the earthed electrode at the origin station $S_0$ and the movable electrode at the station $S_n$, and between the two fixed reference stations, namely, the origin station $S_0$ and the last station $S_N$ along the profile line s—s. If the surface-profile line s—s is directed across the average direction of the telluric currents, the corresponding potential values $E_1, E_2 \ldots E_N$, may be found to remain fairly constant, and of relatively small magnitude. The potential profiles will pass through the origin, corresponding to the station $S_0$, at one end; and the ordinates of the other ends will be plotted above the point N, equal to the average of the values $E_1, E_2 \ldots E_N$. Plotting the values $e_1, e_2 \ldots e_n$ against their respective ranges would approximate to the potential-profile curve 3 of Fig. 4. It is substantially the profile that would obtain if the telluric currents had remained steady, and of such value as to give a steady potential $E_1$ between the terminals A and B. The normal-potential-profile curve will be the straight line 6 (Fig. 6) passing through the origin at one end, and the ordinate $E_1$ at the opposite end. That curve, the ordinates of which are the differences of corresponding ordinates of the corrected experimental profile and the normal profile, is the desired potential profile due to the local currents alone that are associated with the oil formation.

As before explained, the successive $E_n$ measurements associated with the several $e_n$ measurements required to develop an experimental potential profile may differ among themselves, due to varying telluric currents. Under such conditions, the slope of the normal-potential profile associated with the $e_n$ measurements made at the several points along the profile path will differ among themselves, since the slope in each case is measured by its associated $E_n$ value.

The straight line 7 from the origin O to the point $E_n$ represents the normal-potential profile that was maintained along the profile path s—s at the time that the measurements $e_n$ and $E_n$ were made, at a time later than when the measurements $e_1$ and $E_1$ were made. Such a profile would result from plotting the potential difference between the stations $S_0$ and $S_n$, as ordinate, at all points $n$ along the profile path, under the ideal conditions that the terrain along the profile is homogenous and is traversed only by telluric or earth currents that hold constant as of that moment. Let it be assumed that, at the time that the measuremens $e_n$ and $E_n$ were made, the telluric currents had increased over what they had been at the time of the readings $e_1$ and $E_1$, thereby yielding a value of $E_n$ greater than $E_1$. The normal-potential profile 7 corresponding to this measurement will then lie above the normal-potential profile 6—which regards the value $E_1$ as determining the normal profile. The difference $\Delta e_n$ between these two profiles, along the ordinate line at the point $n$, corresponding to the station $S_n$, represents an increase in $e_n$ beyond what it would have been had the telluric current, at the time of the measurement, been the same as it was when $e_1$ and $E_1$ were measured. This difference $\Delta e_n$, which is the correction to be applied to any measurement $e_n$, may obviously be expressed as $$\Delta e_n = (E_n - E_1)\frac{X_n}{L}$$

where $X_n$ represents the distance of the station $S_n$ from the end station $S_0$ and L represents the distance between the end stations $S_0$ and $S_N$.

If the N stations at which the various values of $e_n$ are measured are equally spaced, the above equation will become $$\Delta e_n = (E_n - E_1)\frac{n}{N}$$

since $$\frac{n}{N}$$

like $$\frac{X_n}{L}$$

represents the fractional part of the distance from the station $S_0$ to the station $S_n$ over which $e_n$ is measured. If $e_n'$ represents the potential at the station $S_n$ that would have obtained if the telluric currents had not changed from the conditions that obtained during the measurements of $e_1$ and $E_1$, or, in other words, the corrected potential, then $$e_n' = e_n - \Delta e_n$$
$$= e_n - (E_n - E_1)\frac{n}{N}$$

This correction obviously becomes additive whenever $E_n$ is less than $E_1$. By means of this relation, it is possible to correct to a steady datum the values $e_1, e_2 \ldots e_n$, for distortion introduced by shifting and varying telluric currents.

In plotting $e_n'$, a profile may be obtained corresponding to constant telluric-current conditions such as to make the potential difference across the whole profile equal to $E_1$. There is no reason, however, for choosing any particular normal-potential profile as the common datum to which to refer the measurements. In the above illustration, for example, the normal-potential profile corresponding to 20 millivolts was chosen as the reference. It is more convenient, however, to choose the normal-potential profile at zero slope as the common datum. The $e_n$ measurements may be reduced to a normal-potential profile of zero slope, for example, by making $E_1 = 0$. The resulting potential profile will then represent only the departures from a horizontal linear configuration that are caused by non-homogeneities along the profile path; it will be corrected for the effect produced by any components of the telluric currents directed along the respective profile paths. This preferred expression for $e_n'$ will then simplify to $$e_n' = e_n - \frac{n}{N}E_n$$

Potential profiles obtained by plotting the successive corrected values $e_n'$ as ordinates, and the respective distances of the points of measurement from the origin as abscissae, will be substantially free from distortions caused by telluric currents. Such corrected potential profiles may thus serve to locate and determine the character of oil-bearing formations by indicating the presence of the vertical current sheets that I have found associated with the horizontal boundaries of such formations.

The potential data corrected for the effect of telluric currents derived along a plurality of selected surface-profile lines s—s covering the area subtended by an oil-bearing formation may be correlated to a common datum and plotted on a map. This may be effected in three steps, as illustrated in Fig. 8: first, by running, as through a point (a), one or more cross potential-profile lines P—P, also corrected for telluric currents; secondly, by raising or lowering the several crossed profiles s—s into agreement at the respective points of intersection of these profiles with the profiles; and thirdly, by connecting points of equal potential by lines to form equipotential curves. As explained in the before-mentioned application, these plots of equipotential curves, too, may be employed to determine the presence and the extent, as well as other characteristics, of oil-bearing formations. They may give a better overall picture of the underlying oil-bearing formation than might be obtained from potential or potential-differential profiles alone.

It is possible, of course, to practice the invention analytically, rather than graphically. There are mathematical relations corresponding to the plotted curves, and having corresponding critical points and features.

Electromagnetic theory predicts: first, that a vertically directed earth current will give rise to closed equipotential lines on the overlying earth's surface and that, conversely, the presence of closed equipotential lines predicates the presence of a vertically directed current; and secondly, that the line of maximum or minimum potential will define the axis of the current stream. In the case of an oil-bearing formation where the vertical current stream takes the form of sheets arising along its boundary, it follows that the axis of these sheets will be the maximum or the minimum line defining this boundary. In accordance with my discovery that vertical current sheets are associated with the side boundaries of oil-bearing formations, therefor, the presence of the closed equipotential lines of Fig. 8 proves the existence of vertically directed currents; and, since the dashed line M of minimum potential depicts the axis of the vertical current sheet, it represents the side limits of the production area. This will become more clear from a consideration of Figs. 1 and 2, showing that the potential-profile curve across a rising current sheet passes through a maximum $b'$ as the curve crosses the point where the current sheet divides; and shows further that, conversely, a descending current sheet causes the potential-profile curve to pass through a minimum $d'$ at the point where the divided current sheet unites. The locus M (Fig. 8) of the maximum or minimum potential points will consequently give the line axis of the current sheets, and hence the boundary of the underlying oil formation.

The slope of the formation is along the line $s'—s'$ and the greater crowding of the lines at the $v_1$ border or limit shows that this edge of the formation lies nearer to the surface than does the $t_1$ edge. The formation thus dips from $v_1$ to $t_1$. It may be proved that, other things being equal, the density of the equipotential lines adjacent to the current axis is roughly proportional to the inverse cube of the depth of the formation. An approximate value of the proportionality factor having been determined from field observations, the approximate depth may be determined in terms of the density of the equipotential lines adjacent to the current axis at either or both limits, as represented at $v_1$ and $t_2$.

The concept and use of the normal-potential profile thus serves two distinct and about equally important purposes. First, it provides a method and a procedure for developing potential profiles across a prospective area that substantially eliminates the baffling distortions and masking effects of telluric currents, without seriously distorting the configurations caused by local polarized formations. Secondly, it provides a simple method and procedure for adjusting the numerous potential profiles taken across an area to proper relative levels to make the survey two-dimensional, and thus permit location of the equipotential contours.

According to the provisions of the patent statutes, I have set forth the principle and mode of operation of my invention, and have illustrated and described what I now consider to represent its best embodiments. I desire to have it understood, however, that, within the scope of the appended claims, the invention may be practiced otherwise than as specifically illustrated and described.

The invention herein described and claimed may be manufactured and used by or for the Government of the United States of America for governmental purposes without the payment of any royalties thereon or therefor.

I claim:

1. A method of determining the presence or the physical characteristics, such as the probable boundaries, the depth and the inclination, of an oil-bearing formation that comprises measuring at points along a profile line differences of electrical potential caused in part by the natural currents of the oil-bearing formation and in part by extraneous currents, correcting the measurements to eliminate therefrom the influence of the extraneous currents, plotting a curve the ordinates of which depend upon the corrected differences of potential and the abscissae of which depend upon the positions of the said points and, if the said curve is of a type that has a critical feature or features known to represent earth potentials resulting from current streams arising from the peripheries of a known type of oil-bearing formation and known to indicate the presence or the physical characteristics, such as the boundaries, the depth and the inclination, of the known type of oil-bearing formation, determining, by analogy with the critical feature or features of the said curve of the said type that is known to indicate the presence or the physical characteristics, such as the boundaries, the depth and the inclination, of the known type of oil-bearing formation, the probable presence or characteristics of the first-named oil-bearing formation.

2. A method of determining the presence or the physical characteristics, such as the probable boundaries, the depth and the inclination, of an oil-bearing formation that comprises measuring at points along a profile line differences of electrical potential caused in part by the natural currents of the oil-bearing formation and in part by extraneous currents, correcting the measurements to eliminate therefrom the influence of the extraneous currents, determining a relation between the corrected differences of potential and the positions of the said points and, if the said relation is of a type that has a critical feature or features known to represent earth potentials resulting from current streams arising from the peripheries of a known type of oil-bearing formation and known to indicate the presence or the physical characteristics, such as the boundaries, the depth and the inclination, of the known type of oil-bearing formation, determining, by analogy with the critical feature or features of the said relation of the said type that is known to indicate the presence or the physical characteristics, such as the boundaries, the depth and the inclination, of the known type of oil-bearing formation, the probable presence or characteristics of the first-named oil-bearing formation.

3. A method of determining the presence or the physical characteristics, such as the probable boundaries, the depth and the inclination, of an oil-bearing formation that comprises measuring at points on the earth differences of electrical potential caused in part by the natural currents of the oil-bearing formation and in part by extraneous currents, correcting the measurements to eliminate therefrom the influence of the extraneous currents, plotting equipotential curves based on the said corrected measurements and, if the plot of the said equipotential curves is of the type that has a critical feature or features known to represent earth potentials resulting from current streams arising from the peripheries of a known type of oil-bearing formation and known to indicate the presence or the physical characteristics, such as the boundaries, the depth and the inclination, of the known type of oil-bearing formation, determining, by analogy with the critical feature or features of the plot of the said equipotential curves of the said type that are known to indicate the presence or the physical characteristics, such as the boundaries, the depth and the inclination of the known type of oil-bearing formation, the probable presence or characteristics of the first-named oil-bearing formation.

4. A method of prospecting for an oil-bearing formation which comprises the steps of measuring along a surface-profile line differences of electrical potential that are caused by both extraneous currents and the natural currents associated with the formation, separately measuring along the same surface-profile line differences of potential caused solely by the extraneous currents, plotting the uncorrected and normal-potential-profile curves respectively from the data so obtained, and subtracting the ordinates of the normal-profile curve from those of the uncorrected potential-profile curve to obtain the corrected profile curve caused by the natural currents.

5. A method of determining the presence or the physical characteristics, such as the probable boundaries, the depth and the inclination, of an oil-bearing formation that comprises measuring at points along a profile line differences of electrical potential caused in part by the natural currents of the oil-bearing formation and in part by extraneous currents, measuring the potential difference between the ends of the profile line substantially simultaneously with the measurements at the said points, utilizing the data obtained through the second-named measurements to correct the first-named measurements in order to eliminate from the first-named measurements the influence of the extraneous currents, plotting a curve the ordinates of which depend upon the corrected differences of potential and the abscissae of which depend upon the positions of the said points and, if the said curve is of a type that has a critical feature or features known to represent earth potentials resulting from current streams arising from the peripheries of a known type of oil-bearing formation and known to indicate the presence or the physical characteristics, such as the boundaries, the depth and the inclination, of the known type of oil-bearing formation, determining, by analogy with the critical feature or features of the said curve of the said type that is known to indicate the presence or the physical characteristics, such as the boundaries, the depth and the inclination, of the known type of oil-bearing formation, the probable presence or characteristics of the first-named oil-bearing formation.

6. A method of determining the presence or the physical characteristics, such as the probable boundaries, the depth and the inclination, of an oil-bearing formation that comprises measuring at points along a profile line differences of electrical potential caused in part by the natural currents of the oil-bearing formation and in part by extraneous currents, measuring the potential difference between the ends of the profile line substantially simultaneously with the measurements at the said points, utilizing the data obtained through the second-named measurements to correct the first-named measurements in order to eliminate from the first-named measurements the influence of the extraneous currents, determining a relation between the corrected differences of potential and the positions of the said points and, if the said relation is of a type that has a critical feature or features known to represent earth potentials resulting from current streams arising from the peripheries of a known type of oil-bearing formation and known to indicate the presence or the physical characteristics, such as the boundaries, the depth and the inclination, of the known type of oil-bearing formation, determining, by analogy with the critical feature or features of the said relation of the said type that is known to indicate the presence or the physical characteristics, such as the boundaries, the depth and the inclination, of the known type of oil-bearing formation, the probable presence or characteristics of the first-named oil-bearing formation.

7. A method of determining the presence or the physical characteristics, such as the probable boundaries, the depth and the inclination, of an oil-bearing formation that comprises measuring between an end of a profile line and intermediate points of the profile line differences of electrical potential caused in part by the natural currents of the oil-bearing formation and in part by extraneous currents, measuring the potential difference between the ends of the profile line substantially simultaneously with the first-named measurements, utilizing the data obtained through the second-named measurements to correct the first-named measurements in order to eliminate from the first-named measurements the influence of the extraneous currents, plotting a curve the ordinates of which depend upon the corrected differences of potential and the abscissae of which depend upon the positions of the said points and, if the said curve is of a type that has a critical feature or features known to represent earth potentials resulting from current streams arising from the peripheries of a known type of oil-bearing formation and known to indicate the presence or the physical characteristics, such as the boundaries, the depth and the inclination, of the known type of oil-bearing formation, determining, by analogy with the critical feature or features of the said curve of the said type that is known to indicate the presence or the physical characteristics, such as the boundaries, the depth and the inclination, of the known type of oil-bearing formation, the probable presence or characteristics of the first-named oil-bearing formation.

8. A method of determining the presence or the physical characteristics, such as the probable boundaries, the depth and the inclination, of an oil-bearing formation that comprises measuring between reference points and other points differences of electrical potential caused in part by the natural currents of the oil-bearing formation and in part by extraneous currents, measuring the potential difference between the reference points substantially simultaneously with the first-named measurements, utilizing the data obtained through the second-named measurements to correct the first-named measurements in order to eliminate from the first-named measurements the influence of the extraneous currents, plotting a curve the ordinates of which depend upon the corrected differences of potential and the abscissae of which depend upon the positions of the said points and, if the said curve is of a type that has a critical feature or features known to represent earth potentials resulting from current streams arising from the peripheries of a known type of oil-bearing formation and known to indicate the presence or the physical characteristics, such as the boundaries, the depth and the inclination, of the known type of oil-bearing formation, determining, by analogy with the critical feature or features of the said curve of the said type that is known to indicate the presence or the physical characteristics, such as the boundaries, the depth and the inclination, of the known type of oil-bearing formation, the probable presence or characteristics of the first-named oil-bearing formation.

9. A method of determining the presence or the physical characteristics, such as the probable boundaries, the depth and the inclination, of an oil-bearing formation that comprises measuring at points on the earth differences of electrical potential caused in part by the natural currents of the oil-bearing formation and in part by extraneous currents, measuring the potential difference between reference points substantially simultaneously with the first-named measurements, utilizing the data obtained through the second-named measurements to correct the first-named measurements in order to eliminate from the first-named measurements the influence of the extraneous currents, plotting equipotential curves based on the said corrected measurements and, if the plot of said equipotential curves is of the type that has a critical feature or features known to represent earth potentials resulting from current streams arising from the peripheries of a known type of oil-bearing formation and known to indicate the presence or the physical characteristics, such as the boundaries, the depth and the inclination, of the known type of oil-bearing formation, determining, by analogy with the critical feature or features of the said plot of said equipotential curves of the said type that is known to indicate the presence or the physical characteristics, such as the boundaries, the depth and the inclination of the known type of oil-bearing formation, the probable presence or characteristics of the first-named oil-bearing formation.

HARVEY C. HAYES.